Nov. 8, 1927.  
M. HOFFMAN  
1,648,480  
SYNCHRONIZED MOTION PICTURE AND SOUND REPRODUCTION  
Filed Aug. 18, 1927  
3 Sheets-Sheet 1
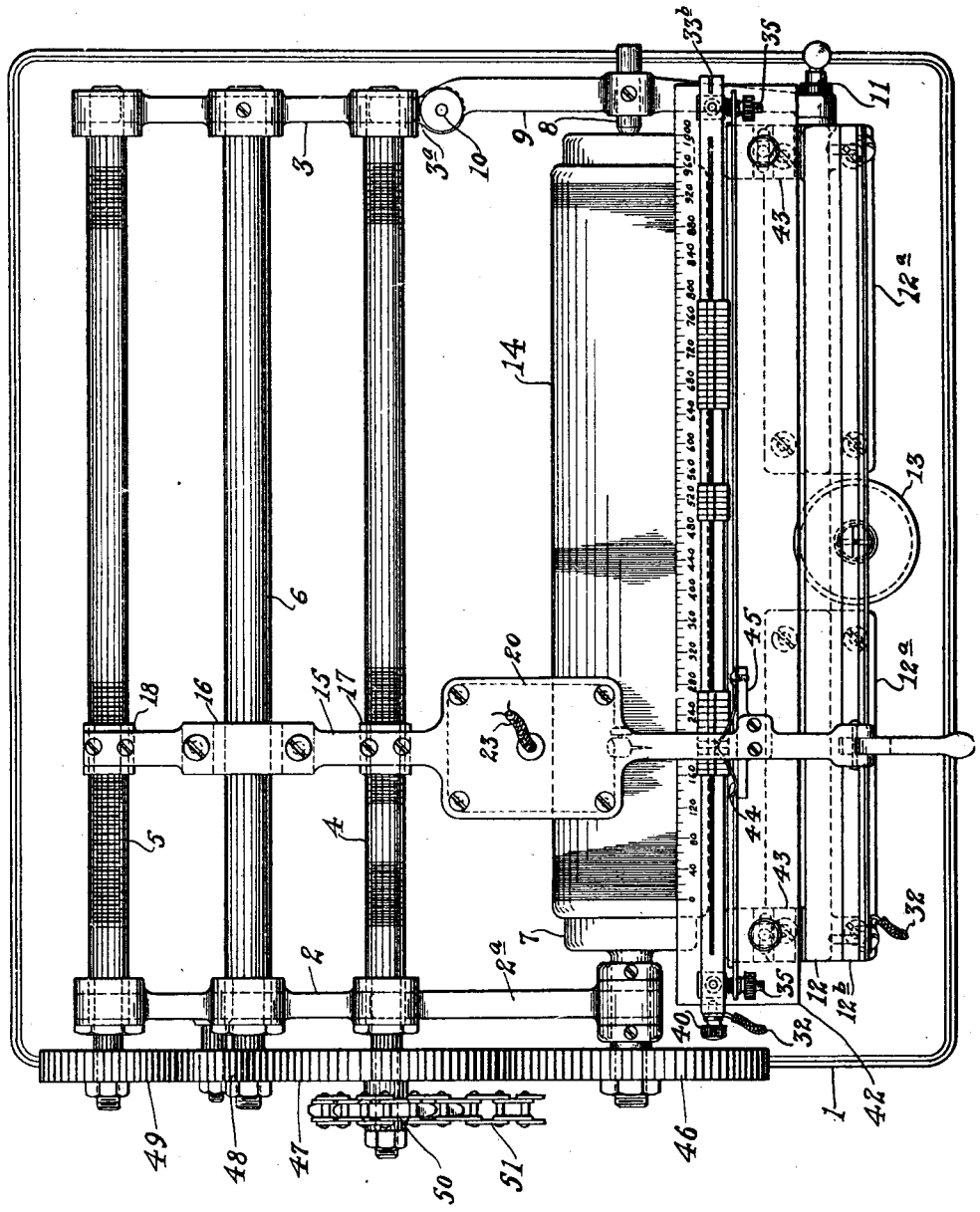

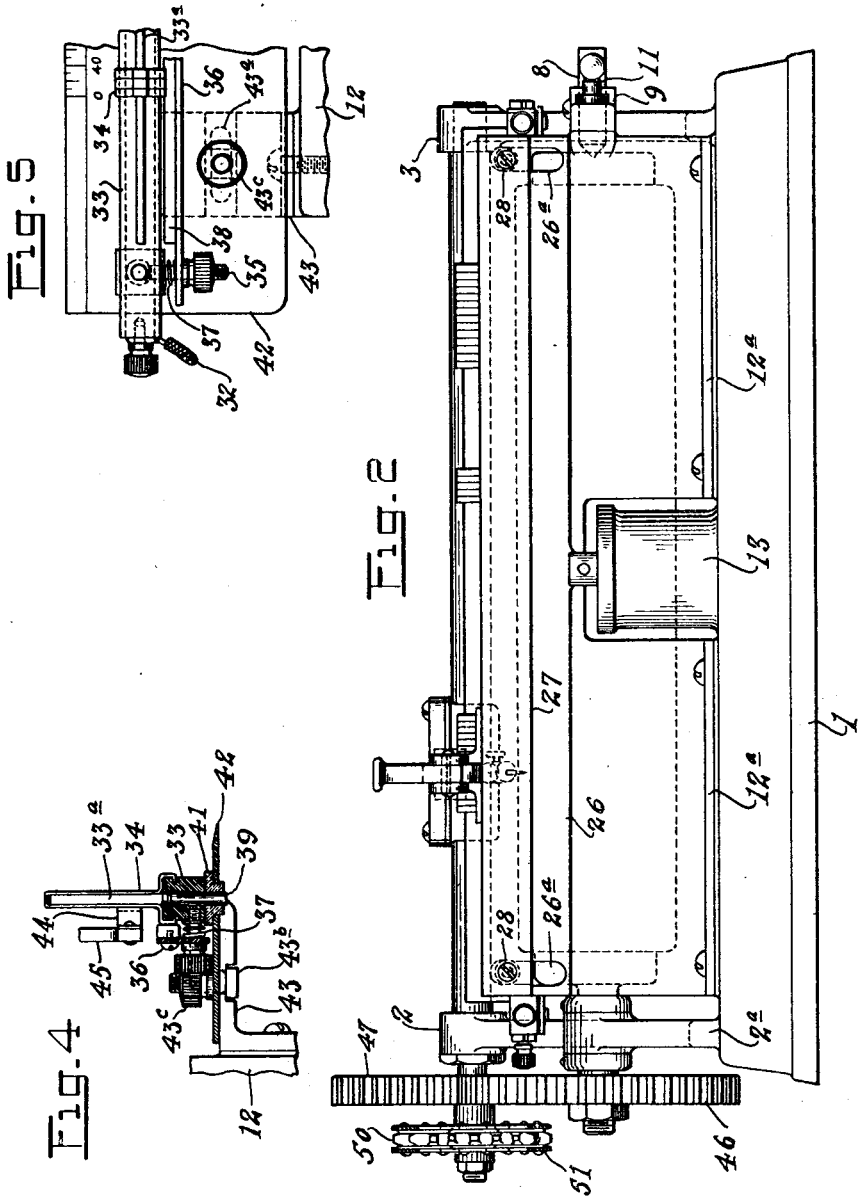

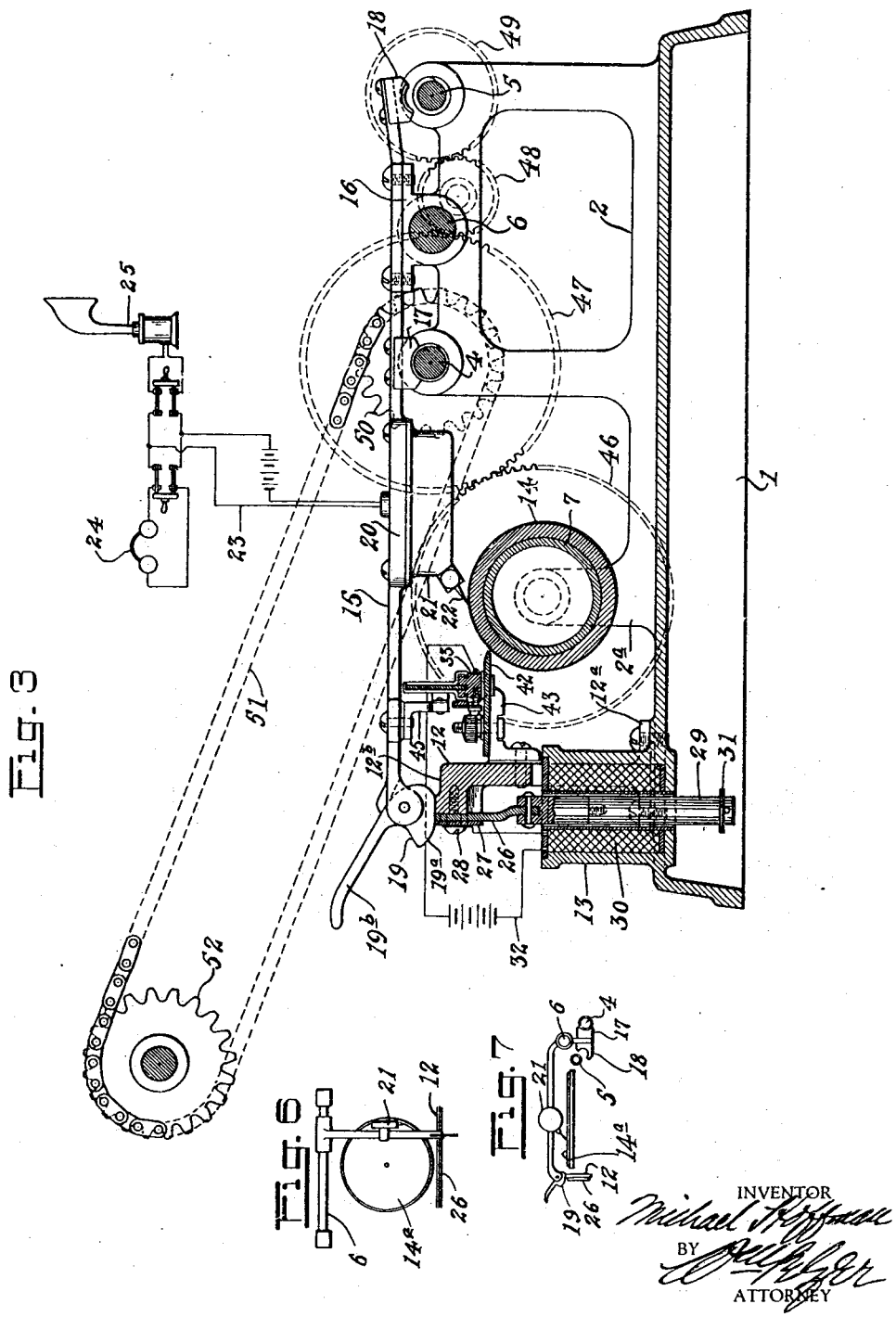

Patented Nov. 8, 1927.

1,648,480

UNITED STATES PATENT OFFICE.

MICHAEL HOFFMAN, OF BROOKLYN, NEW YORK.

SYNCHRONIZED MOTION-PICTURE AND SOUND REPRODUCTION.

Application filed August 18, 1927. Serial No. 213,730.

My invention relates to combined motion picture projecting and sound reproducing machines operating in unison and wherein the sound record consists of vocal, instrumental or other sounds appropriate to the subject, parts and scenes represented in a picture and arranged for completing the accoustical and optical illusion presented by such picture on a screen.

The main object of the present invention is to provide means capable of manual adjustment or setting at will for automatically eliminating from reproduction any part or parts of a sound record as may be necessary or desirable to co-ordinate the sound record with the motion picture in the event that any part or parts of the motion picture film are removed for any reason, and thereby maintain the proper synchronism between the operation of the two machines or picture and sound reproduction. It is well understood that, in combining and operating two such machines in unison the picture film and sound record must have the same time duration, or at least the one must have a definite starting and stopping point relative to the other, and that to produce the desired effect the sounds must be in unison with the motions, actions or effects portrayed by the picture. This effect may be readily produced where the picture and sound record are reproduced as originally made, but as is well known, parts of the picture film become mutilated and cannot be immediately replaced, or parts may be intentionally removed from the picture, and in such cases it becomes necessary to make adjustments in the operation of the sound reproducing machine to maintain the proper synchronism, and that such adjustments must be practically instantaneous.

In carrying my invention into effect I preferably combine with a motion picture projector the type of phonograph which is designed for reproducing sounds from cylindrical records, and having a feed screw and slide rest for the reproducer arm. Such machine I may drive by directly connecting the same to an operating shaft of the motion picture projecting machine, either by direct shafting, gearing or chain drive, or the phonograph may have its own motor and provision made for starting and stopping the sound reproduction in unison with the picture film movement and projection. To this type of phonograph I add a secondary feed screw of much greater pitch than the normal or primary feed screw, and I also add a movable auxiliary slide rest which is arranged to effect in one movement the raising of the reproducer arm for the purpose of disengaging the reproducer stylus from the sound record and the primary feed arm from the normal feed screw, and the engagement of an auxiliary feed arm with the high pitched feed screw. The movement of this auxiliary slide-rest is preferably effected by means of an electro-magnetic device, such as a solenoid. In addition I provide means, capable of manual adjustment, for automatically effecting the shift from the primary to the secondary feed screw at predetermined points, and such means preferably consist of a bar carrying adjustable contacts with which a contact blade or brush mounted on a movable arm makes contact to energize the electromagnetic device for operating the movable auxiliary slide rest, the circuit to which is made and broken as the contact blade is moved along the contact bar by the movable arm. In practice I prefer to mount this circuit controlling device on the phonograph and to secure the moving contact blade on the reproducer arm of the phonograph.

My invention is illustrated in the accompanying drawings, in which Figure 1 is a plan view of the sound reproducing machine; Figure 2 a front elevation; Figure 3 a central vertical section through Figure 1, with the addition of a diagrammatic illustration of the circuit connections for the electro-magnetic shifting device and for the sound reproducer or loud-speaker co-operating with the phonograph reproducer, and the driving connection between the phonograph and motion picture projector; Figure 4 a detail view, partly in elevation and partly in section, of the automatic controlling device; Figure 5 a partial plan view of the same device; and Figures 6 and 7 are schematic plan and end views of a modification employing a disc sound record. The details of the motion picture projector are not shown since the construction and operation is well understood, and it being thought sufficient for the proper understanding of my invention to merely illustrate a driving connection between the two machines.

Referring to the drawings, and more particularly to Figure 1, the base of the phonograph is indicated at 1, and from which two bearing plates 2 and 3 project vertically, the former having a forward extension 2ª, and the latter a lug 3ª. In these plates are formed the bearings for the normal feed screw 4 and the high pitch feed screw 5, and also the centers for the reproducer guide-rod 6. In the extension 2ª is formed a bearing for the spindle of record cylinder 7, which at the opposite end is provided with a centering hole to receive a centering pin pin 8 which is adjustably mounted on endgate 9. This gate is hinged at 10 to the lug 3ª, and at the underside of the forward end it is slotted to receive the locking bolt 11. The reproducer slide-rest is shown at 12, and is in the form of a vertical plate having rectangular extensions 12ª by means of which it is bolted to base 1, and having also a forwardly projecting flange 12ᵇ at its upper edge, and which flange has a vertical bead planed to a straight-edge to form the slide for the presser-foot of the reproducer arm. At its mid-section plate 12 has a large opening (see Figure 2) which permits the plate to straddle a cylinder 13 projecting from base 1. The locking bolt 11 for the end-gate is hinged at the right-hand end of plate 12 so as to swing downward out of the slotted end of gate 9 to permit the gate to be opened for placing a cylindrical sound record 14 on cylinder 7 or the removal of a record therefrom.

The reproducer arm is shown at 15, Figures 1 and 2, and to the underside of which is bolted a slide collar 16 adapted to slide on rod 6. In front of the slide collar and in alignment with the feed screw 4 is bolted a nut-section 17, and at the rear end is bolted a nut-section 18 adapted to engage with feed screw 5. The rear end of the reproducer arm 15 is bent upward sufficiently to permit nut-section 18 to clear feed screw 5 while the arm is fed at the normal operating speed, and also while the arm is held in an intermediate or inoperative position, as will be presently explained. The forward end of the reproducer arm is slotted to receive a pivoted presser-foot 19 (see Figure 3) having a flat face adapted to slide on the straightedge of rest 12. As shown in Figure 3, the presser-foot, reproducer arm, and nut section 17 are in the position for normal operation with the reproducer stylus in contact with the record. The face of the presser-foot is developed into a cam face at 19ª so that when the operating lever 19ᵇ is pressed downward, the reproducer arm will be caused to rock on the guide-rod and disengage the feed nut 17 from feed screw 4, but not far enough to cause nut section 18 to engage screw 5, and at the same time disengaging the reproducer stylus from the record, thus placing the reproducer arm in its intermediate or inoperative position. In this position of the reproducer arm a sound record may be placed in position or removed from the cylinder 7. If desired cam face 19ª may be extended so that further depression of lever 19ᵇ will rock the arm 15 sufficiently to cause nut section 18 to engage screw 5, thus providing manual control for the high speed non-sound-reproducing feed of the reproducer arm. At a section of the reproducer arm slightly to the rear of the axis of the record cylinder is an enlargement 20 to which is secured the sound or vibration reproducer 21 having a stylus 22, see Figure 3. For the purpose of illustration, this reproducer is shown generically as an electrical reproducer of the sound vibrations formed on the record 14, whereby the vibrations imparted to the stylus by the record undulations will be transformed into electrical undulations, which in turn are transmitted over a circuit 23 of any suitable amplifying character to a telephone head-set 24, and reproducer or so-called loud-speaker 25. It will be understood, however, that my improved sound reproducing machine may be provided with any type reproducer such as commonly employed in sound reproducing machines wherein a diaphragm is directly operated by a stylus to produce sound.

The automatic shifting means for disengaging the reproducer stylus and normal feed, and connecting the reproducer arm with the secondary or high speed feed to eliminate predetermined parts of the sound record from reproduction comprises an auxiliary slide-rest, a solenoid for actuating same, a stationary adjustable contact bar and a movable brush or contact blade for controlling the circuit to the solenoid. The auxiliary slide-rest 26 is in the form of a plate equal in length to the stationary slide rest 12, and is provided with vertical slots 26ª at its ends which permit vertical sliding movement. Plate 26 is held against the face of flange 12ᵇ of the stationary slide rest by a guard plate 27 and screws 28 which pass through slots 26ª, and which screws are shouldered so as not to bind plate 26. When the auxiliary slide rest is in its lowermost or inactive position the upper edge of the plate is in the same plane with the straight-edge of slide 12, see Figure 3. The solenoid for actuating the auxiliary slide rest is shown at 30 and is housed in the cylinder 13 as best seen in Figure 3. The movable core 29 is slotted at its upper end and into this slot projects a lug from the center of the lower edge of plate 26 and is pinned thereto. Core 29 is made in two parts screwed together, as shown in Figure 3, and the upper part which is attached to the plate 26 is made of non-magnetic material. The upward movement of the core when the coil is energized is limited by a stop 31 which may be adjustable. It will be observed that when the solenoid is energized and the core drawn upward, the auxiliary slide rest 26 will be moved upward, raising the reproducer arm and causing the reproducing stylus 22 and feed nut 17 to be disengaged, and nut 18 to engage feed screw 5 and thereby cause the reproducer to be fed forward at a high rate of speed, without, however, reproducing any vibrations from the sound record. This forward feed without sound reproduction will continue so long as the solenoid remains energized. The winding of the solenoid is connected to a circuit 32, one terminal of which is connected to one of the screws 28, or other part of the machine frame, and the other terminal is connected to the contact bar 33 which forms part of the third element of the automatic shifting means. Bar 33, which is preferably square in cross section, extends the full length of the machine, as seen in Figure 1, and is longitudinally slotted on its upper surface to receive a plate of insulating material 33ª which is secured in position in any suitable manner. Near the upper edges of the sides of the bar 33 are cut narrow slots (see Figure 4) adapted to receive the hooked ends of contact clips 34 which straddle the insulating plate 33ª and are adjustable on the bar 33 by sliding them along the bar to any predetermined position. The faces of these clips in practice will be quite narrow, about one-twentieth of an inch in width, and these clips may be set individually or in groups as shown in Figures 1 and 2, to form a contact of any desired length from the minimum width represented by one clip. On the front face of the bar 33, at both ends, are screws 35 provided with thumb-nuts (see Figure 5) and upon these screws a locking plate 36 is loosely mounted against spiral springs 37, and this plate is provided on the inner side with a facing of soft or compressible material 38, such as rubber. The purpose of this plate is to lock the contact clips 34 in position on the bar 33 by tightening the nuts on screws 35 and thereby squeezing the soft facing against the clips. To shift the clips on bar 33, the nuts on screws 35 are screwed back, allowing springs 37 to move plate 36 outward and its facing out of contact with the clips. The clips may now be adjusted to any desired point or into any desired grouping and then locked in position again by tightening screws 35. Bar 33 is also provided with pin-holes at each end which register with pins 39, Figure 4, and at the left hand end is a binding-post 40, Figure 1, to which one terminal of circuit 32 is attached. Pins 39 are rigidly mounted in insulating disks 41 which are rigidly mounted on a gauge plate 42. Bar 33 with its contact clips 34 and locking bar 36 is removable and interchangeable with contact bars having the contact clips arranged for any given sound record as will be hereinafter more fully explained.

Gauge plate 42 is provided with a scale of any desired graduations, as for instance, a scale indicating the number of record threads or grooves on the sound record 14. Or the scale may represent the length of motion picture film in feet; or if, as in the preferred form, the sound record is twelve inches in circumference, each record thread will be equal to one foot of motion picture film, and therefore the scale 42 will indicate both record threads and film feet. This gauge is adjustably carried on two brackets 43 which are bolted to the inner side of slide plate 12. Each bracket 43 is provided with a slot 43ª, see Figure 5, through which project screws having square heads 43ᵇ seated in squared recesses in the underside of the brackets, and these screws pass upward through holes in the gauge plate and are provided with thumb-nuts 43ᶜ by means of which the plate is clamped to the brackets; the slots in the brackets permitting slight longitudinal adjustment of the gauge relative to the record cylinder. It is well known that in sound reproducing machines operating with cylindrical records, that the records vary slightly in internal diameter and that therefore the longitudinal position of the record on cylinder 7 will vary slightly. The adjustability of gauge 42 is to meet this variation and permit the zero graduation to be adjusted to the first thread or groove of the record. As indicated in Figure 1, and assuming the record grooves on cylinder 14 run 100 to the inch, and twelve inches in circumference, each graduation on the scale will repre ent 10 threads, or 120 inches of sound record, or ten feet of motion picture film. If it be desired, for instance, to eliminate from reproduction, the sound vibrations recorded in threads indicated on the scale as from 160 to 270, 490 to 550, and 650 to 790, three groups of contact clips 34 will be arranged on the bar 33 as indicated in Figure 1. When the clips are so arranged and clamped in position by bar 36, the contact bar may be removed and replaced at will for the same record and the same eliminations, and if there is any variation in the position of the record cylinder 14 when replacing it on cylinder 7, all that is necessary to obtain a proper positioning of the contact bar relative to the sound record is to loosen thumb-nuts 43ᶜ and reset the scale so that its zero graduation will register with the first thread on the record and then clamp it in position on the brackets. When the contact bar 33 with its groups of contact clips is now replaced on the scale 42 the registration of the contacts relative to the record will again be as indicated in Figure 1, since the contact clips are clamped in position on the bar and the holes in the underside of the bar 33 registering with pins 39 will place the bar in its proper and original position on the scale plate 42. For the purpose of identifying a record contact bar 33 having contact clips 34 arranged for sound eliminations for a certain record, I will employ identifying tags which may be attached to the contact bar 33 in any suitable manner, as for instance by the provision of a slot 33^b at the right hand end of the bar, Figure 1, into which a tag may be inserted and pinned in place, or a hole may be provided for receiving a split ring bearing a tag.

The circuit to the solenoid is completed by a brush or contact blade 44 secured to a bracket 45 which is bolted to the underside of reproducer arm 15 in front of the contact bar 33. This contact brush is shown in the form of an inverted V strip of spring metal with one end secured to the bracket and the other end bearing against the bracket, the point of contact with the insulating plate and contact clips being at the apex of the V. It will be observed in Figures 3 and 4 that the insulating plate 33^a and clips 34 are relatively high compared to the width of the brush 44. The purpose of this is to insure the brush remaining in contact with plate 33^a or clips 34 when the reproducer arm is held in elevated position by the movable slide rest or the movement of the presser-foot 19.

The phonograph cylinder and feed screws are rotated by a train of gears 46, 47, 48 and 49 which may be driven in any suitable manner, but for the purpose of the present illustration, a sprocket wheel and chain drive 50, 51 and 52 is shown. Sprocket wheel 52 may be driven from any source of constant speed, but in this instance is intended to represent a wheel on a shaft of a motion picture projector so that the rotation of the record cylinder will start and stop with the movement of the motion picture film, and at the proper relative speeds.

In Figures 6 and 7 I have shown a schematic illustration of a disk type of sound reproducing machine. In these views 4 and 5 indicate the normal and secondary feed screws, respectively, and 17 and 18 the feed nuts carried by the reproducer arm; 6 the guide rod for the reproducer arm; 12 and 26 the fixed and movable slide rests, respectively, and 19 the cam presser-foot for the reproducer arm; 14^a indicates the disk record carried by the usual rotating table and 21 represents the reproducer. In this type of machine the movable slide rest 26 would be operated in the same manner as illustrated in Figure 3 in connection with the cylinder type of machine, and a similar contact bar 33 and brush 44 would be employed, but in this case the scale 42 could be dispensed with, and pins 39 for locating and fixing the contact bar would project from the base plate of the machine. These details are obvious and hence are omitted from the drawings to avoid unnecessary duplication. The spindle of the rotary table for the record would be driven from a connection with the motion picture machine as indicated in Figure 3 or by any other suitable constant speed drive and controlled by any suitable means for starting and stopping the two machines and to keep them running in unison.

The high speed secondary feed for the reproducer arm may be as rapid as desired within practical limits. For instance the normal surface speed of the sound record may be twelve inches per second, which is the normal speed of motion picture film feed, and the high pitch feed screw may have four threads to the inch as compared, for instance, to a normal feed for the reproducer arm equivalent to 100 threads per inch, and the high pitch screw may be driven at, say 240 R. P. M. and the normal feed screw at 60 R. P. M. Under such conditions the normal forward feed of the reproducer arm would be one thread or 1/100 of an inch per second; whereas, the forward high speed feed would be at a rate due to four revolutions of the screw having four threads per inch, or one inch per second, which would be equivalent to 100 record threads, or 100 feet of motion picture film. Such rapid non-sound-reproducing feed movement would be practically instantaneous, since the elimination would occur in one one-hundredth of the time it would take to reproduce that length of picture and sound record at normal running speed. In practice, the contact clips will be arranged so that each sound record elimination will be slightly in excess of its respective picture film deletion, so that the slight picture film feed taking place during the time that the phonograph is operating at the high speed non-sound-reproducing feed will be compensated for and absolute synchronism maintained.

In motion picture service it is customary to inspect picture films for imperfections, such as bad joints, torn sprocket holes, picture mutilations, etc., and repairs are made before shipment or before the reel of film is again run through the projector, and in making such repairs short sections are deleted. Also in many instances certain parts of a picture reel are deleted for various reasons, and such deletions at times are permanent and very often only temporary. In all such cases where a sound record had been prepared as an accompaniment to the picture, it was necessary to prepare a cue sheet for the purpose of indicating to the machine operator when and what adjustments to make in order to maintain synchronism between the motion picture projection and the sound reproduction. From the foregoing description of my invention it will be readily understood how this may be accomplished automatically during the operation of the two machines running in unison by the employment of the attachments to the sound reproducing machine above outlined. Where a picture and record are to be reproduced as originally made, that is without eliminations, the contact bar of the phonograph is either removed entirely or the contact clips are removed therefrom or shifted out of contact range. When, however, a picture has been deleted, the picture and its sound record will be run in unison for the purpose of arranging the record eliminations. This is done by setting contact clips in position on the contact bar as the points in the motion picture where deletions occur are reached, and as many contact clips from one up are arranged in one or more groups to cover the entire range and length of the picture omissions. A contact bar so arranged may be employed as a sample for additional bars where more than one reel of the same picture, similarly deleted, is in service; and where the deletions are dissimilar a contact bar will be specially prepared for each reel. And, as above explained, each contact bar will have its contact clips clamped against displacement by its locking-bar, and therefore the prepared contact bars may be retained for indefinite use, or they may be modified from time to time as the respective motion pictures for which the bars were prepared are modified by further deletions or replacements. And, as above stated, these bars will be tagged and may be shipped to users with each pair of picture and sound records. But, it will be observed, the user is always in position to make his own picture and record deletions by first making the desired deletions in the picture and then running the picture and its sound record in unison to arrange the contact bar for effecting the automatic sound record eliminations.

I do not claim herein the construction of the sound reproducing machine per se since that feature of my invention is separately claimed in my application for Letters Patent for improvements in sound reproducing machines, filed Oct. 11, 1927, Serial No. 225,407.

What I claim is:

1. In apparatus for synchronously projecting pictures and reproducing sound records, the combination of a picture projector, a sound reproducing machine provided with means for discontinuing and resuming sound reproduction without interrupting the forward feed of the sound reproducer, means for effecting the operation of the two machines in unison, and a device for automatically effecting the operation of said first-named means at predetermined points relative to the picture and sound record, whereby predetermined parts of the sound record may be automatically omitted from reproduction and synchronism between picture projection and sound reproduction maintained.

2. In apparatus for synchronously projecting pictures and reproducing sound records, the combination of a picture projector, a sound reproducing machine provided with means for raising and lowering the sound reproducer arm for discontinuing and resuming sound reproduction without interrupting the forward feed of the reproducer arm, means for effecting the operation of the two machines in unison, and a device for automatically effecting the operation of said first-named means at predetermined points relative to the picture and sound record, whereby predetermined parts of the sound record may be automatically omitted from reproduction and synchronism between picture projection and sound reproduction maintained.

3. In apparatus for synchronously projecting pictures and reproducing sound records, the combination of a picture projector, a sound reproducing machine provided with a two-speed feeding mechanism for the sound reproducer and means for changing the feed from one speed to the other and simultaneously eliminating sound reproduction during the high speed feed, means for effecting the operation of the two machines in unison, and a device for automatically controlling the operation of said first named means at predetermined points relative to the picture and sound record, whereby predetermined parts of the sound record may be automatically omitted from reproduction and the reproducer simultaneously fed at high speed to restore synchronism with uninterrupted picture projection.

4. In apparatus for synchronously projecting pictures and reproducing sound records, the combination of a picture projector, a sound reproducing machine provided with a movable slide-rest for the sound reproducer arm and means for operating the slide-rest to raise or lower the reproducer arm for the purpose of discontinuing or resuming sound reproduction without interrupting the forward feed of the reproducer arm, means for effecting the operation of the two machines in unison, and a device for automatically controlling the slide operating means at predetermined points relative to the picture and sound record, whereby predetermined parts of the sound record may be automatically omitted from reproduction and synchronism between picture projection and sound reproduction maintained.

5. In apparatus for synchronously projecting pictures and reproducing sound records, the combination of a picture projector, a sound reproducing machine provided with a two-speed feeding mechanism for the sound reproducer arm, a movable slide-rest for said arm and means for operating the slide-rest to raise or lower the reproducer arm for the purpose of discontinuing or resuming sound reproduction and simultaneously changing the feeding drive from normal to high speed, or vice versa, means for effecting the operation of the two machines in unison, and a device for automatically controlling the slide operating means at predetermined points relative to the picture and sound record, whereby predetermined parts of the sound record may be automatically omitted from reproduction and the reproducer simultaneously fed at high speed to restore synchronism with uninterrupted picture projection.

6. In apparatus for synchronously projecting pictures and reproducing sound records, the combination of a picture projector, a sound reproducing machine provided with means for discontinuing and resuming sound reproduction without interrupting the forward feed of the sound reproducer, means for effecting the operation of the two machines in unison, and a manually adjustable device for automatically effecting the operation of said first-named means at predetermined points relative to the picture and sound record, whereby predetermined parts of the sound record may be automatically omitted from reproduction and synchronism between picture projection and sound reproduction maintained.

7. In apparatus for synchronously projecting pictures and reproducing sound records, the combination of a picture projector, a sound reproducing machine provided with a two-speed feeding mechanism for the sound reproducer and means for changing the feed from one speed to the other and simultaneously eliminating sound reproduction during the high speed feed, means for effecting the operation of the two machines in unison, and a manually adjustable device for automatically controlling the operation of said first-named means at predetermined points relative to the picture and sound record, whereby predetermined parts of the sound record may be automatically omitted from reproduction and the reproducer simultaneously fed at high speed to restore synchronism with uninterrupted picture projection.

8. In apparatus for synchronously projecting pictures and reproducing sound records, the combination of a picture projector, a sound reproducing machine provided with a two-speed feeding mehanism for the sound reproducer arm, a movable slide-rest for said arm and means for operating the slide-rest to raise or lower the reproducer arm for the purpose of discontinuing or resuming sound reproduction and simultaneously changing the feeding drive from normal to high speed, or vice versa, means for effecting the operation of the two machines in unison, and a manually adjustable device for automatically controlling the slide operating means at predetermined points relative to the picture and sound record, whereby predeterminer parts of the sound record may be automatically omitted from reproduction and the reproducer simultaneously fed at high speed to restore synchronism with uninterrupted picture projection.

9. In apparatus for synchronously projecting pictures and reproducing sound records, the combination of a picture projector, a sound reproducing machine provided with electrically operated means for discontinuing and resuming sound reproduction without interrupting the forward feed of the sound reproducer, means for effecting the operation of the two machines in unison, and a circuit controlling device for automatically controlling the circuit to said electrically operated means at predetermined points relative to the picture and sound record, whereby predetermined parts of the sound record may be automatically omitted from reproduction and synchronism between picture projection and sound reproduction maintained.

10. In apparatus for synchronously projecting pictures and reproducing sound records, the combination of a picture projector, a sound reproducing machine provided with a two-speed feeding mechanism for the sound reproducer arm, a movable slide-rest for said arm and electro-magnetic means for operating the slide-rest to raise or lower the reproducer arm for the purpose of discontinuing or resuming sound reproduction and simultaneously changing the feeding drive from normal to high speed, or vice versa, means for effecting the operation of the two machines in unison, and a circuit controller comprising one or more adjustable contacts, a movable member, and means for advancing the movable member in unison with picture projection and sound reproduction to automatically close and open the circuit to said electro-magnetic means at predetermined points, whereby predetermined parts of the sound record may be automatically omitted from reproduction and the reproducer simultaneously fed at high speed to restore synchronism with uninterrupted picture projection.

11. In a picture projecting and sound reproducing unit of the character defined in claim 9, a removable contact bar for the circuit controller, having one or more adjustable contacts thereon.

12. In a picture projecting and sound reproducing unit of the character defined in claim 9, a removable contact bar for the circuit controller, comprising a metal rod, a plate of insulating material mounted thereon, and adjustable contact clips engaging said rod and straddling the insulating plate.

13. In a picture projecting and sound reproducing unit of the character defined in claim 9, a removable contact bar for the circuit controller, comprising a metal rod, a plate of insulating material mounted thereon, adjustable contact clips engaging said rod and straddling the insulating plate, and a locking device on said bar for securing the contact clips in position on said rod.

14. In a picture projecting and sound reproducing unit of the character defined in claim 9, a removable contact bar for the circuit controller having one or more adjustable contacts thereon, an adjustable gauge upon which said bar is mounted, said gauge having one or more graduations thereon for determining its adjustment, means for locking the gauge in adjusted position, and a movable contact member moving in unison with picture projection and sound reproduction to automatically close and open the circuit to said electrically operated means at predetermined points.

15. In a picture projecting and sound reproducing unit of the character defined in claim 9, a removable contact bar for the circuit controller having a pair of positioning holes therein, a plate of insulating material mounted on said bar, one or more contact clips engaging said bar and straddling said insulating plate, a locking device on said bar for securing the contact clips in position, an adjustable gauge plate having a pair of pins with which the holes in said bar register to fix same in position on said gauge, said gauge having one or more graduations thereon for determining its adjustment, means for locking the gauge plate in adjusted position, and a movable contact member moving in unison with picture projection and sound reproduction to automatically close and open the circuit to said electrically operated means at predetermined points.

This specification signed at New York city, in the county and State of New York, this 17th day of August, 1927.

MICHAEL HOFFMAN.